United States Patent
Tervo

(12) 
(10) Patent No.: US 6,186,277 B1
(45) Date of Patent: Feb. 13, 2001

(54) FRONT AXLE DIFFERENTIAL BEARING CAP AND LUBRICATION/COOLING METHOD

(75) Inventor: Martin D. Tervo, Brighton, MI (US)

(73) Assignee: Chrysler Corporation, Auburn Hills, MI (US)

( * ) Notice: Under 35 U.S.C. 154(b), the term of this patent shall be extended for 0 days.

(21) Appl. No.: 09/204,420

(22) Filed: Dec. 2, 1998

(51) Int. Cl.$^7$ ................................... F01M 11/02
(52) U.S. Cl. ............... 184/6.12; 184/11.1; 184/13.1; 384/462
(58) Field of Search ................. 384/462, 466, 384/472, 473, 397; 475/160; 184/6.12, 6.27, 11.1

(56) References Cited

U.S. PATENT DOCUMENTS

| | | |
|---|---|---|
| 1,180,715 | 4/1916 | Heaslet . |
| 2,016,343 | 10/1935 | Oberem . |
| 2,037,173 | 4/1936 | Matthews . |
| 2,147,145 | 2/1939 | Carlson et al. . |
| 2,178,900 | 11/1939 | Starr . |
| 2,609,710 | 9/1952 | Osborn . |
| 3,413,873 | 12/1968 | Bixby . |
| 3,762,503 | 10/1973 | Wilder et al. . |
| 3,785,458 * | 1/1974 | Caldwell et al. .................. 184/6.12 |
| 3,838,751 | 10/1974 | Brown . |
| 3,887,037 | 6/1975 | Haluda et al. . |
| 4,018,097 | 4/1977 | Ross . |
| 4,095,675 | 6/1978 | Bell . |
| 4,157,045 | 6/1979 | Suzuki . |
| 4,199,202 | 4/1980 | Maeda . |
| 4,231,266 | 11/1980 | Nishikawa et al. . |
| 4,242,923 | 1/1981 | Nishikawa et al. . |
| 4,244,242 | 1/1981 | Uno et al. . |
| 4,261,219 | 4/1981 | Suzuki et al. . |
| 4,283,963 | 8/1981 | Hickey et al. . |
| 4,656,885 * | 4/1987 | Hori et al. ........................... 475/160 |
| 4,733,578 | 3/1988 | Glaze et al. . |
| 4,754,847 | 7/1988 | Glaze et al. . |
| 4,842,100 | 6/1989 | Cameron et al. . |
| 5,232,291 | 8/1993 | Kuan . |
| 5,269,731 | 12/1993 | Scudder et al. . |
| 5,325,826 | 7/1994 | Cierpial et al. . |
| 5,826,986 * | 10/1998 | Adkins et al. ....................... 384/462 |

* cited by examiner

Primary Examiner—David A. Bucci
Assistant Examiner—Chong H. Kim
(74) Attorney, Agent, or Firm—Roland A. Fuller, III

(57) ABSTRACT

An apparatus for lubricating a cooling rotary components in a vehicle drivetrain. The apparatus is defined by a single component bearing cap having integrally formed lubricant deflectors to direct lubricant flow to lubricant-starved side bearings in a drive axial differential carrier assembly. The lubricant deflectors extend angularly outward from the ends of the bearing cap. The bearing cap is secured to a housing portion of a drive axle differential carrier assembly of the vehicle drivetrain. A differential bearing assembly is pinched between the bearing cap and bearing mounting surfaces of the drive axle differential carrier assembly.

6 Claims, 4 Drawing Sheets

FRONT AXLE DIFFERENTIAL BEARING CAP AND LUBRICATION/COOLING METHOD

BACKGROUND OF THE INVENTION

1. Technical Field

The present invention generally relates to an apparatus for lubricating rotary components in a vehicle drivetrain and, more particularly, to a bearing cap with integrated oil deflectors for directing oil to rotary components in a drive axle differential carrier assembly which are otherwise not susceptible to receiving ample oil for lubrication and cooling.

2. Discussion

Diverse drivetrain configurations are well known in the art. Automotive manufactures desire the flexibility of offering a variety of drivetrain packages, so as to meet the broadest possible needs of the greatest number of vehicle operators. Consequently, as the drivetrain configurations vary, so do the locations of the various drivetrain components. The already prevalent problem of achieving adequate lubrication and cooling of the various rotary components, particularly the bearings, is magnified when the various rotary components are located in positions, which (although necessary to achieve the desired drive outputs) block the necessary flow of lubricating/cooling fluid to these components.

Although problematic, systems of lubricating and cooling the various rotary components of a vehicle drivetrain are also well known in the art. Most problematic, however, is getting the proper amount of lubricant to components which are typically not susceptible to receiving even a minimal amount of lubricant, because of the surrounding structures which obstruct the flow of lubricant to these lubricant-starved components. Forwardly located rotary components present additional lubrication and cooling problems, particularly when the vehicle is moving up an incline.

Traditionally, the rotary components most susceptible to inadequate lubrication and cooling by the flow of lubricant during vehicle operation are the side bearings in the drive axle differential carrier assembly. Generally, as the vehicle is being operated, lubricant is splashed around the enclosed differential housing at a rate of approximately 2000 revolutions per minute (or 40 miles per hour). However, due to the location of the differential bearings and the bearing caps attacher thereto, the side bearings of the differential carrier assembly are obstructed from the lubricant splash, causing a very minimal amount of the splashed lubricant to reach the side bearings. In turn, the poorly lubricated and cooled side bearings of the differential carrier assembly can cause inefficient vehicle operation and increased vehicle maintenance and repair costs. It is also common to manufacture channels In within the carrier assembly as a means of directing the flow of lubricant to those areas not in the splash pattern. However, this method also suffers from similar disadvantages. The manufacture of channels in the carrier assembly increases the manufacturing cost, and the presence of the channels typically does not amply direct the flow of lubricant to those well obstructed components.

As such, there remains the need for a method and apparatus, which efficiently and cost-effectively directs the flow of lubricant to obstructed rotary components which are not susceptible to receiving a proper amount of lubricant for lubrication and cooling.

SUMMARY OF THE INVENTION

The present invention provides an improved method and apparatus for lubricating and cooling rotary components in a vehicle drivetrain. The invention finds particular utility as a bearing cap, wherein its integrated lubricant deflectors direct the flow of lubricant to otherwise lubricant-starved side bearings in a drive axle differential carrier assembly. Traditional bearing caps actually aid in the obstruction of lubricant flow to the side bearings. The present invention is advantageous over its traditional predecessors in that it catches the lubricant as it is being splashed around in the enclosed differential housing and funnels the lubricant into the location of the side bearings.

Generally, the present invention is a single piece bearing cap which integrally incorporates an outwardly extended lubricant deflector on each of its two ends. A bore extends from the upper to the lower surface of each of the two ends of the bearing cap. Bolts extend through the bores to secure the bearing cap to the drive axle differential carrier assembly. A differential bearing assembly is pinched between the bearing cap and the bearing mounting surfaces of the drive axle differential carrier assembly.

DETAILED DESCRIPTION OF THE PREFERRED EMBODIMENT

It should be understood that the present invention will be described in connection with a specific example of the best mode of practicing the invention currently contemplated by the inventor. However, it should be realized that the scope of this invention is not to be limited to this specific example since, in this case, the invention has broad applicability to a variety of related lubrication and cooling methods and apparatuses.

Figure 1:
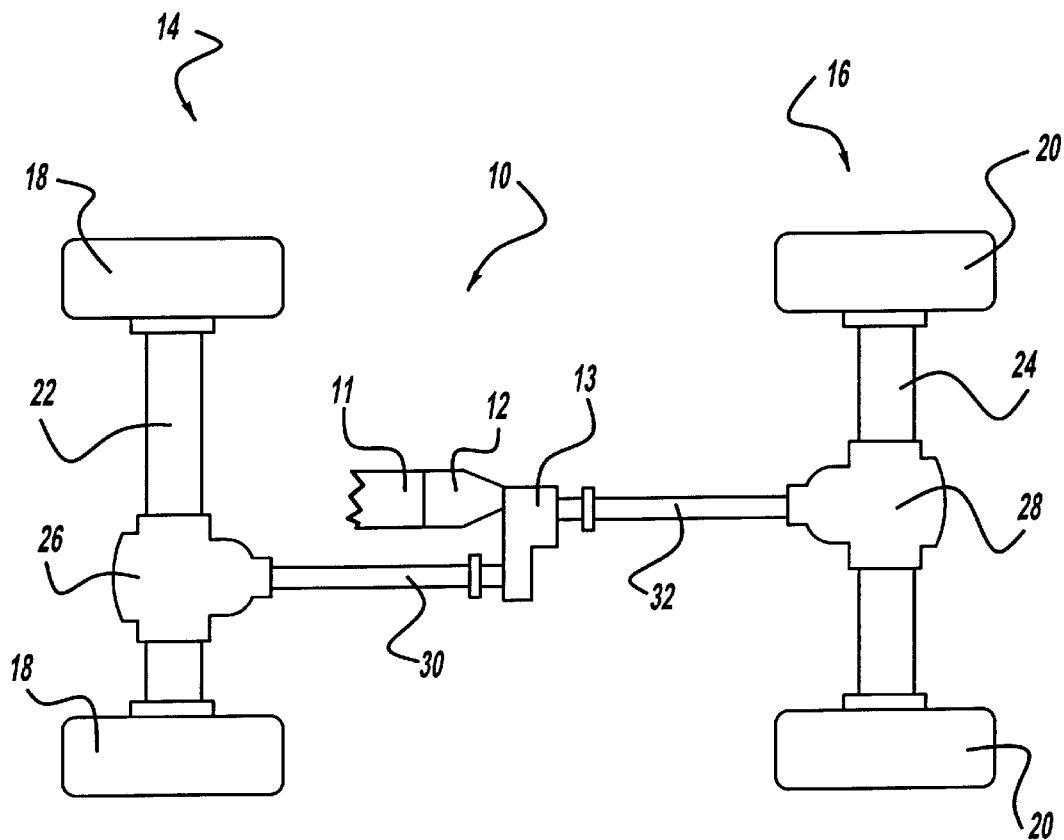
FIG. 1 is a top plan view of a conventional vehicle drivetrain.

As schematically illustrated in FIG. 1, a vehicle drivetrain 10 is generally defined by an engine 11, a transmission 12 and a transfer case 13. The vehicle drivetrain 10 is further defined by generally mirror-imaged front and rear drivelines 14, 16, each respectively including a pair of wheels 18, 20 and an axle assembly 22, 24, which interconnects the pair of wheels 18, 20. Front and rear axle differential carrier assemblies 26, 28 are incorporated into axle assemblies 22, 24, respectively. Front and rear drive shafts 30, 32 interconnect the front and rear wheels 18, 20 to the engine 11, transmission 12 and transfer case 13 via the front and rear axle assemblies 22, 24.

Figure 2:
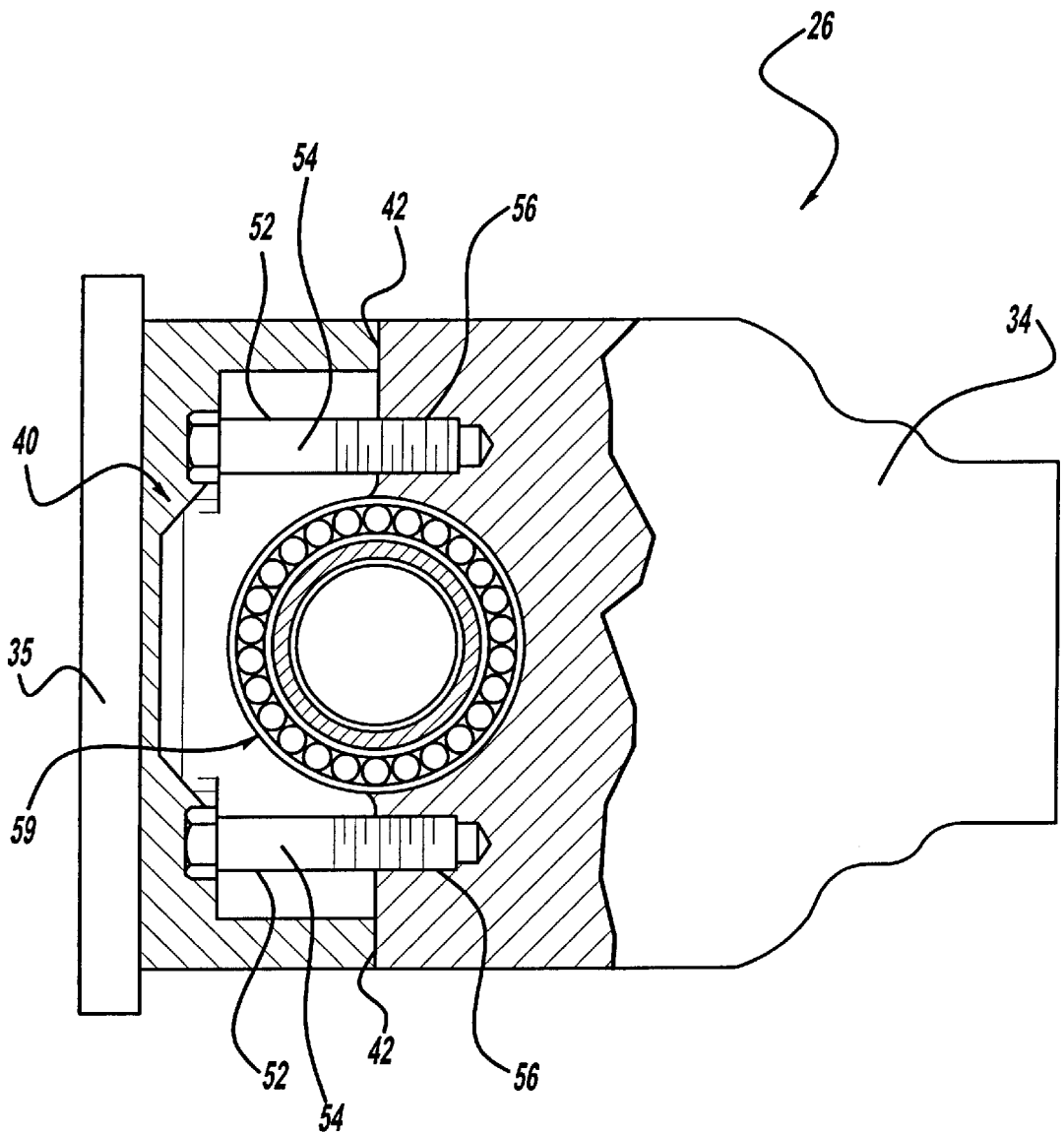
FIG. 2 is a cross-sectional side view of a drive axle differential carrier assembly showing an embodiment of the differential bearing cap of the present invention secured to the housing of the differential carrier assembly.
Figure 3:
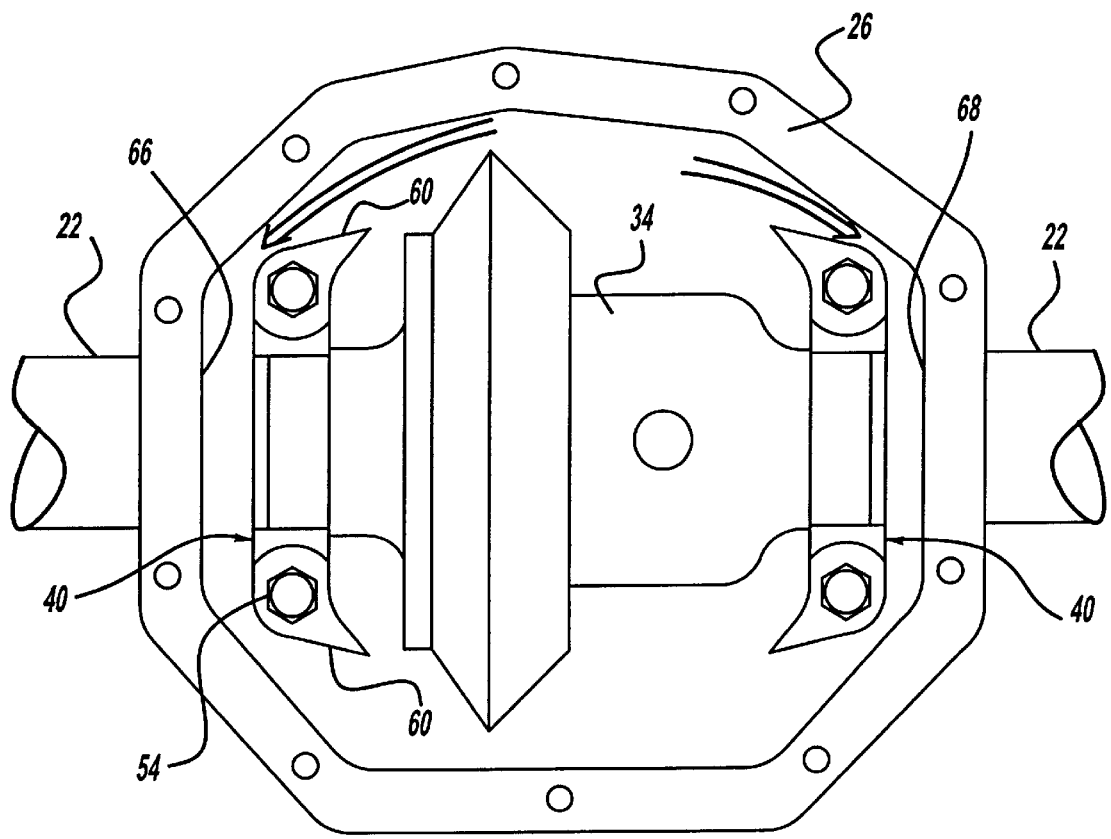
FIG. 3 is a plan view of a differential case with the bearing cap of the present invention.

With reference to FIG. 2, a partially cross-sectional side view of the front: axle differential carrier assembly 26 is shown peripherally defined by a stationary differential carrier housing 34 having a front rim 35 and opposing side bearing apertures 36, 38. As will be detailed, and as seen in FIG. 3, a differential bearing cap assembly 40 is attached to bearing mounting members 42 of the front axle differential carrier assembly 26. The bearing cap assembly 40 directs lubricant around the differential carrier 26.

Figure 4:
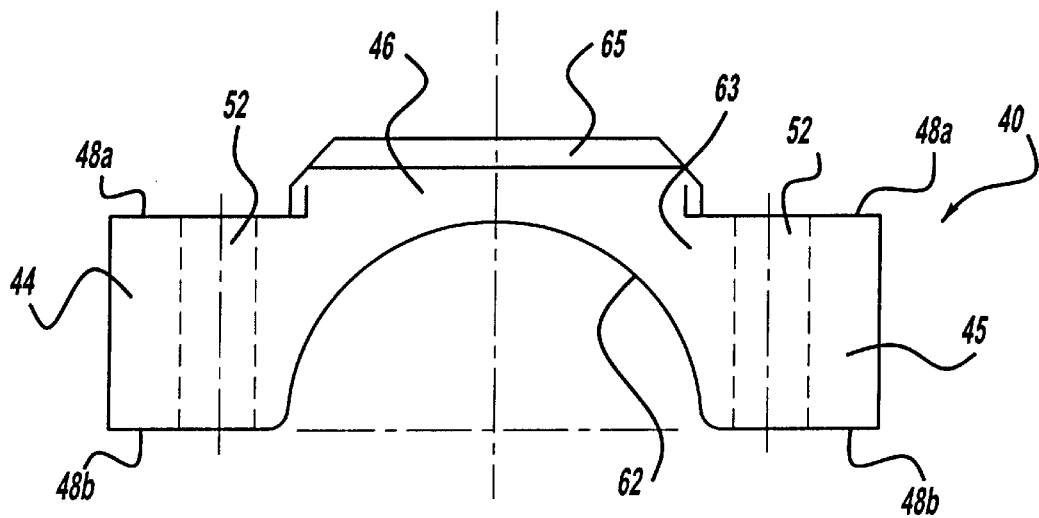
FIG. 4 is a side elevational view of an embodiment of the bearing cap of the present invention.
Figure 5:
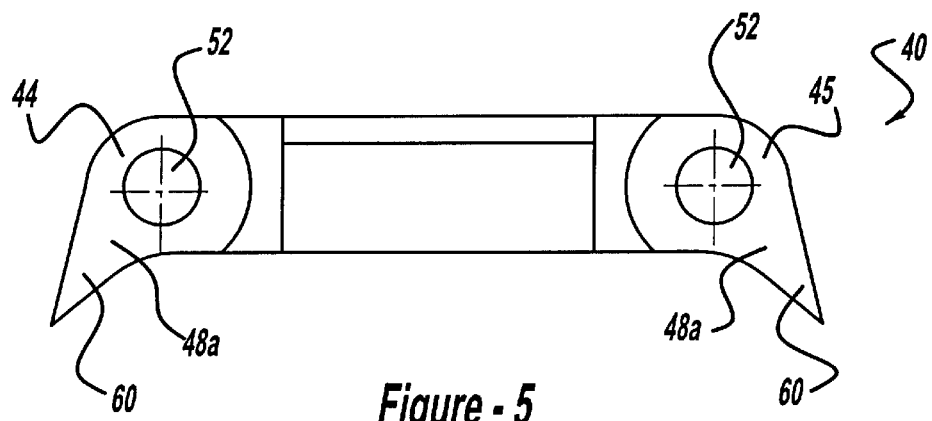
FIG. 5 is a top plan view of an embodiment of the bearing cap of the present invention.
Figure 6:
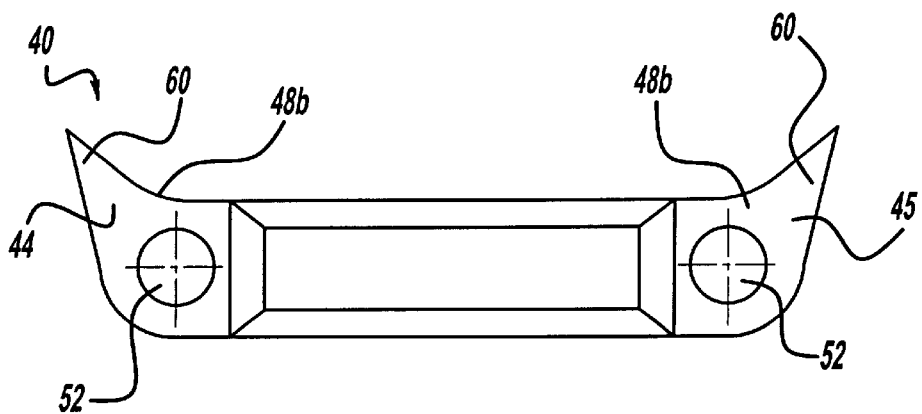
FIG. 6 is a bottom plan view of an embodiment of the bearing cap of the present invention.

With particular reference now to FIGS. 4–6, the bearing cap assembly 40 consists of two end members 44, 45 and a center member 46. Each of the end members 44, 45 includes upper and lower surfaces 48a, 48b and a bore 52 extending therebetween. Bolts 54 extend from upper surfaces 48a through lower surfaces 48b and mate with corresponding bores 56 formed in the differential carrier housing 34. Bolts 54 are used to secure the differential bearing cap assembly 40 to the differential carrier housing 34, pinching a bearing assembly 59 therebetween. Each of the end members 44, 45 also include an integrally formed, angularly extending lubricant deflector 60, which runs from the upper surface 48a to the lower surface 48b. It should be appreciated that the lubricant deflectors 60 may extend at any angle necessary to direct the lubricant to the desired lubricant-starved component(s).

The front axle differential carrier assembly 26 of the present invention further includes side bearings 66, 68 which are positioned within side bearing apertures 36, 38. During vehicle operation the lubricant deflectors 60 catch the oil as it splashes around enclosed differential carrier housing 34 and directs the lubricant to the otherwise lubricant-starved side bearings 66, 68.

The bearing cap assembly 40 further includes a semicircular recess 62 adapted to receive the bearing assembly 59. The center member 46 of the bearing cap assembly 40 includes side surfaces 63 and a raised top surface 65.

The bearing cap assembly 40 of the present invention is preferably made of aluminum. However, the bearing cap assembly may be made of any suitable material having the properties desired for the particular application. Such materials may include cast iron, plastic and various composite materials. It should also be appreciated that the present invention may be adapted not only to serve as a cap for an axle differential bearing assembly, but may also be adapted to serve as a cover for any similar assembly, in an application requiring the flow of oil to be directed to oil-starved components.

It should further be appreciated that while a preferred embodiment of the present invention suggests the integral formation of the oil deflectors 60 with the differential bearing cap assembly 40, such an integration is not required. Preference is made to this embodiment because it is easier to manufacture the oil deflectors 60 as an integral part of the bearing cap assembly 40. Additionally, a preferred embodiment of the present invention utilizes nuts and bolts to secure the bearing cap assembly 40 to the differential carrier housing 34. However, any suitable pin and fastener combination may be appropriately substituted.

The foregoing discussion discloses and describes merely an exemplary embodiment of the present invention. One skilled in the art will readily recognize from such discussion, as well as from the accompanying drawings and claims, that a wide array of changes, modifications and variations can be made thereto, without departing from the spirit and scope of the invention as defined in the following claims.

What is claimed is:

1. A lubricating and cooling apparatus for directing the flow of lubricant to a side bearing assembly in an axle differential carrier of a vehicle drivetrain, the axle differential carrier including a housing portion and a differential bearing assembly and mounting members within an interior of the housing portion, said lubricating and cooling apparatus comprising:

a bearing cap affixed to the mounting members in the housing portion of the axle differential carrier, wherein the differential bearing assembly is pinched between said bearing cap and the mounting members, said bearing cap being an elongated member with two ends and two substantially planar sides, each end including an integrally angularly extending lubricant deflector for directing the flow of lubricant to lubricant-starved areas of the side bearing assembly, each said deflector extending radially outwardly and axially into an area of the interior of the housing portion, each said deflector extending on the same side of said bearing cap elongated member at a transverse angle from a plane of the same one of said planar sides from which said deflector extends.

2. The lubricating and cooling apparatus of claim 1 wherein said bearing cap has a recess for receiving said bearing assembly.

3. A bearing cap in with a front axle differential bearing assembly housed within an interior of a housing portion of an axle differential carrier and having mounting members within the housing portion, said bearing cap comprising:

a bearing cap affixed to the mounting members in the housing portion of the axle differential carrier;

wherein the differential bearing assembly is pinched between said bearing cap and the mounting members, said bearing cap being an elongated member with two ends and two substantially planar sides, each end including an integrally angularly extending lubricant deflector for directing the flow of lubricant to lubricant-starved areas of the bearing assembly, each said deflector extending radially outwardly and axially into an area of the interior of the housing portion on the same side of said bearing cap elongated member at a transverse angle from a plane of one of said planar sides from which said deflector extends.

4. The bearing cap of claim 3 wherein said bearing cap has a recess for receiving the differential bearing assembly.

5. A lubricating and cooling apparatus according to claim 1, wherein each of said deflectors extends from one end of said elongated member and is substantially co-extensive therewith but angled at said transverse angle from the same side of said bearing cap.

6. A bearing cap according to claim 3, wherein each of said deflectors extends from one end of said elongated member and is substantially co-extensive therewith but angled at said transverse angle from the same side of said bearing cap.

* * * * *